3,526,677
METAL COATING COMPOSITIONS AND
METAL COATED THEREWITH
Ronald H. Dahms, Springfield, and James A. Snelgrove, Monson, Mass., assignors to Monsanto Company, St. Louis, Mo., a corporation of Delaware
No Drawing. Continuation-in-part of application Ser. No. 652,738, July 12, 1967. This application Jan. 6, 1969, Ser. No. 797,319
Int. Cl. B44d 1/42; C08g 37/20
U.S. Cl. 260—839        6 Claims

ABSTRACT OF THE DISCLOSURE

Enamels suitable for use in coating metal to impart corrosion resistance and electrical insulation thereto. These enamel solutions employ a mixture of a resole resin made by reacting formaldehyde with a phenol which has been previously substituted with a specific $C_8$ through $C_{13}$ mixture of carbocyclic compounds and at least one polyvinyl acetal. When coated onto metal, the resulting surfaces display good electrical insulation characteristics, good physical strength properties, and surprisingly low coefficients of friction.

RELATED APPLICATION

This application is a continuation-in-part of our earlier filed copending U.S. application S.N. 652,738, filed July 12, 1967 now abandoned.

BACKGROUND

In the field of metal surfaces, especially wire surfaces coated with enamel, there is characteristically a great deal of surface-to-surface rubbing contact, such as, for example, wire-to-wire contact during coiling and winding operations. Thus, if there is a significant degree of friction between adjoining wires at the time of movement therebetween, serious problems of friction result. This friction, among other things, causes winding voids which seriously affect uniformity of product windings and which adversely affect electrical properties and restrict the amount of electrical conductor that can be put into a pre-chosen limited volume.

Heretofore, to overcome this problem of friction in magnet wire, for example, the art has commonly found it necessary to top-coat or over-coat resin-based enamel coated magnet wire with a material having a low coefficient of friction, such as, for example, a nylon or the like. This requires two coating operations, the first being the application of the enamel, and the second being the application of a top coating. Such a top coating procedure, however, is disadvantageous because it can add to insulation thicknesses, and increase the complexity of the manufacturing process.

There has now been discovered a new and improved liquid enamel metal coating composition which employs a particular substituted phenol-formaldehyde resin and a polyvinyl acetal. This enamel, when deposited onto metal surfaces and thermoset, not only produces a class of coatings having good electrical insulation properties, mechanical properties, and solvent resistance properties, but also having surprisingly low coefficients of friction associated with coating surfaces when used as the top coating or the entire coating in a layered coating. The reason for this reduction in friction is not clear, but possibly could be associated with a certain degree of incompatibility between the particular class of substituted phenol-formaldehyde resins employed and polyvinyl acetal.

The liquid enamel metal coating compositions of the present invention and the improved frictional characteristics associated with thermoset coatings derived therefrom are not substantially adversely affected by the addition to such a liquid coating composition of certain other additives known to the prior art to be useful in improving certain physical properties of product thermoset coatings derived from phenolic resin enamel coating compositions (for example, such properties as cut-through resistance, solvent resistance, and the like). Specifically, one can add to the liquid coating compositions of this invention controlled amounts of such classes of additives as organic isocyanates and melamine formaldehyde resins and obtain not only the expected improvements in thermoset coating physical properties, but also unexpectedly reduced coefficients of friction in thermoset coatings.

SUMMARY

The invention is directed to liquid compositions of certain phenol-formaldehyde resole resins and polyvinyl acetal in solvent medium. These compositions are especially adapted for use in the coating of metal surfaces to produce thermoset coatings having good electrical insulation properties, good mechanical strength properties, and surprisingly good low coefficient of friction characteristics. The coating compositions of this invention comprise:

(A) From about 5 to 75 weight percent of a dissolved substituted phenol-formaldehyde resole resin, (B) From about 5 to 30 weight percent of a polyvinyl acetal, and (C) The balance up to 100 weight percent in any given composition being an organic liquid which:

(1) is substantially inert (as respects reactivity towards such resole resin and such polyvinyl acetal, (2) has a dry point below about 275° C. at atmospheric pressures (preferably below about 200° C.), (3) is a dispersant for both such resole resin and such polyvinyl acetal.

Optionally, up to about 4 weight percent dissolved (in the organic liquid) water can be present, provided the actual quantity of water present in any given coating composition of the invention is such that the water is dissolved in the organic liquid.

This invention is also directed to metal objects, or metal substrates, at least one surface of which is coated with a thermoset coating derived from a coating composition of this invention. One preferred metal substrate is copper, particularly in the form of electrically conductive wire; another preferred metal substrate is iron, especially in the form of steel sheeting formed into steel drums, and the like. The term "metal" as used herein refers to an electro-positive chemical element or mixture thereof characterized by ductility, malleability, luster, and conductivity of heat and electricity, and which can replace the hydrogen of an acid and form bases with the hydroxyl radical.

When the organic liquid portion of the coating compositions of this invention is substantially removed therefrom, as by evaporation or the like, there is produced a thermosettable composition which thermosets by the action of heat alone. The particular time and temperature conditions used for thermosetting vary, depending upon coating thicknesses, substrate, etc. In general, temperatures in the range of from about 175 to 450° C. applied for times of from about 5 seconds to 35 minutes are used, through times and temperatures above and below these values (inversely as respects one another, respectively) can be employed.

A composition is typically applied to a metal substrate surface to form a coating thereon, then dried and finally thermoset. Each thermoset coating individual layer thickness typically ranges from about 0.1 to 1 mil in thickness, although individual layer thicknesses of from about 0.2 to 0.6 mil are common. Thicker and thinner layers can, of course, be used. Commonly, a coating over a given metal substrate may be two or more layers thick, successively applied. Commonly individual layers are under about 0.5 mil in thickness. The composition of this invention can be applied over a base layer or layers, such base layer or layers being characteristically under about 1 mil in thickness, and preferably from about 0.2 to 0.5 mil. An article of manufacture having a metallic surface coated with a composition of this invention characteristically comprises at least one thermoset layer derived from such composition having a thickness range as indicated above. Multiple layered coatings can range up to about 3 mils in thickness and can have, as is conventional in metal coating, especially wire coating, 4, 8, 12 or even more layers of material in a single coating. While a single coating is preferably composed substantially of at least two layers derived from the compositions of this invention, the coatings derived from compositions of this invention can be used in combination with the coatings derived from other compositions known to the prior art for use in metal coating. Examples of polymeric materials known for use as metal coatings include: conventional polyvinyl acetal/cresol-formaldehyde condensates, polyesters, epoxys, oleo resinous enamels, alkyds, polyester-imides, polyamide-imides, polyimides, acrylics, silicones, polyester-amides, polyamides, mixtures thereof, and the like. In general, the enamels of this invention when used on wire as insulative coatings are preferably employed as top coatings, particularly when base and intermediate coatings are derived from other different coating systems.

The phenol-formaldehyde resole resin employed in the products of this invention has a formaldehyde to phenol mol ratio of from about 0.8 to 2.0 (preferably from about 0.9 to 1.5), and is produced by reacting in the presence of a basic (preferably organic) catalyst under liquid aqueous phase conditions, a certain substituted phenol mixture with formaldehyde. The resole resin used in this invention further has a relatively high molecular weight as shown by the fact that it is substantially water insoluble but has a methanol solubility such that a 60 weight percent solution thereof can be prepared in methanol. Such methanol solution characteristically has a viscosity not greater than about 5000 centipoises and preferably in the range from about 50 to 5000 centipoises. In addition, this resin has a free formaldehyde content which is less than about 5 weight percent.

It will be appreciated that the aldehyde to phenol ratios herein described have reference to the total amount of phenol present before a reaction, including the phenol which is substituted.

The substituted phenol mixture used to make such resin is itself prepared by reacting phenol under Friedel-Crafts conditions with a mixture of carbocyclic compounds. This mixture of carbocyclic compounds comprises (on a 100 weight percent basis when in a form substantially free of other materials):

(A) From about 10 through 40 weight percent of compounds, each molecule of which has:

(1) the indene nucleus,
(2) from 9 through 13 carbon atoms,
(3) as nuclear substituents from 0 through 4 methyl groups, (B) From about 5 through 70 weight percent of compounds, each molecule of which has:

(1) the dicyclopentadiene nucleus,
(2) from about 10 through 13 carbon atoms,
(3) as nuclear substituents from 0 through 3 methyl groups, (C) From about 15 through 65 weight percent of compounds, each molecule of which has:

(1) a phenyl group substituted by a vinylidene group,
(2) from about 8 through 13 carbon atoms,
(3) as substituents from 0 through 3 groups selected from the class consisting of methyl and ethyl, (D) From about 0 through 5 weight percent divinyl benzene, (E) Provided that the sum total of all such components in any given such mixture of carbocyclic compounds is always 100 weight percent.

Also in such preferred embodiment, the substituted phenol used in making phenolic resin is made using a carbocyclic compound mixture in which there are from about 20 through 40 weight percent of compounds having the indene nucleus (as above described), from about 15 through 30 weight percent of compounds having the dicyclopentadiene nucleus (as above described) and from about 30 through 65 weight percent of compounds having a phenyl group and a vinylidene group as described, the percentage of divinyl benzene in such a preferred carbocyclic compound mixture, being as described above. In any such more preferred carbocyclic compound mixture, there are a total of 100 weight percent of these three components.

At the time when such controlled mixture of carbocyclic compound is reacted with phenol as indicated, there can be present in such mixture as diluents inert (e.g. as respects reactivity towards reactants and reaction products) organic compounds, such as aromatic and aliphatic hydrocarbons. Thus, there is present, conveniently, at least about 25 weight percent (based on total combined weight of phenol and such controlled mixture) of diluent although this value is variable depending upon reactants and reaction conditions. While there is no apparent upper limit on the amount of diluent which may be present, it is preferred that the amount of diluent present be not greater than about 95 weight percent (same basis).

Carbocyclic compound mixtures useful in this invention can be prepared synthetically or derived from naturally occurring crude petroleum, as those skilled in the art will appreciate. For example, one suitable carbocyclic compound mixture is available from Enjay Chemical Company under the trade designation "Heart Cut LPD." Another suitable such mixture is available from Monsanto Company, St. Louis, Mo., under the trade designation "Resin Oil." Still another such mixture is available from the Gulf Oil Company under the trade designation "Resin Former Feed Stock." A presently preferred such mixture is the Monsanto "Resin Oil" which is a $C_8$ to $C_{13}$ product cut with a boiling range of from about 300° F. to 425° F. (150 to about 220° C.) and contains the indicated carbocyclic compound mixture. Shown below in Table I is a breakdown such as is made by vapor phase chromatography showing the composition of these three carbocyclic compound mixtures:

TABLE I

| | Gulf oil [2] | Monsanto [3] | Enjay [4] |
|---|---|---|---|
| Vinylidene aromatics: | | | |
| Styrene C₈ | 7.6 | 1.4 | 10.1 |
| Alpha-methylstyrene C₉ | 1.6 | 2.8 | 2.2 |
| Beta-methylstyrene C₉ | 1.5 | 1.6 | 2.1 |
| Vinyltoluene C₉ | 4.5 | 17.4 | 10.5 |
| C₂ Alkylstyrene [1] C₁₀ | 0.9 | 6.2 | 5.8 |
| Divinylbenzene C₁₀ | 0.3 | 1.3 | 1.6 |
| Indenes: | | | |
| Indene C₉ | 12.7 | 17.6 | 12.7 |
| Methylindene C₁₀ | 0.3 | 5.5 | 7.6 |
| Cyclopentadienes: | | | |
| Isoprene-cyclopentadiene C₁₀ | 0.6 | 0.3 | |
| Dicyclopentadiene C₁₀ | 42.7 | 13.9 | 1.1 |
| Methylcyclopentadiene C₁₁ | 12.4 | 4.6 | 2.1 |
| Alkyl aromatics: | | | |
| Benzene C₆ | 0.5 | | 0.1 |
| Toluene C₇ | 3.9 | | 0.8 |
| C₂ Alkylbenzene C₈ | 7.4 | 0.4 | 12.1 |
| C₃ Alkylbenzene C₉ | 1.2 | 19.2 | 22.2 |
| C₄ Alkylbenzene C₁₀ | | 4.1 | 6.3 |
| Naphthalenes, naphthalene C₁₀ | 0.2 | 3.2 | 2.2 |
| Unidentified (aliphatics) | 2.1 | | |
| Total carbocyclic compound mixture content | 84.8 | 72.6 | 55.9 |
| ASTM Boil Range, °F. (ASTM D-86): | | | |
| Initial boiling point | 283 | 315 | 307 |
| 10% | 318 | 333 | 320 |
| 50% | 329 | 343 | 342 |
| 90% | 348 | 367 | 401 |
| End Point | 364 | 402 | 411 |
| Residue | 1.0 | | |
| Specific gravity | 0.952 | 0.933 | 0.909 |

[1] This styrene compound is selected from the group consisting of ethylstyrene and dimethylstyrene.
[2] Available commercially from the Gulf Oil Co. as "Resin Former Feed Stock."
[3] Available commercially from the Monsanto Company under the trade designation "Resin Oil."
[4] Available commercially from Enjay Company under the trade designation "Heart Cut LPD."

By the term "dicyclopentadiene" reference is had to a molecule having the structure:

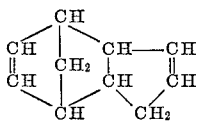

By the phrase "when in a form substantially free of other materials" reference is had to a mixture (e.g. of starting materials, of products, or the like, as the case may be) which is substantially free (e.g. on an analytical or a theoretical basis) of substances (like inerts) other than such mixture itself. For example, in Table I above, the carbocyclic compound mixtures are composed of indenes, vinylidene aromatics, and dicyclopentadienes as well as inert diluents, such as "alkyl aromatics," "naphthalenes" and "unidentified aliphatics," but each contains a combination (on a 100 weight percent basis in a form substantially free of other materials) of components (indenes, dicyclopentadiene, and vinylidene aromatics) as described above.

In this invention, all solids are conveniently measured using the ASTM Test Procedure D115–55.

Also in such a preferred embodiment, the substituted phenol used in making phenolic resin is made using a carbocyclic compound mixture in which there are from about 20 through 40 weight percent of compounds having the indene nucleus (as above described), from about 15 through 30 weight percent of compounds having the dicyclopentadiene nucleus (as above described) and from about 30 through 65 weight percent of compounds having a phenyl group and a vinylidene group as above described, the percentage of divinyl benzene in such preferred carbocyclic compound mixture being as described above. In any such preferred carbocyclic compound mixture, there are a total of 100 weight percent of these three components (on a 100 weight percent basis, when in a form substantially free of other materials).

The term "vinylidene" as used herein has generic reference both to vinylidene radicals (CH₂=C<), and vinyl radicals (CH₂=CH— or —CH=CH—); observe that in carbocyclic compound mixtures used in this invention having a phenyl group substituted by a vinylidene group, alpha-methyl substitution is included in this definition, as well as styrene, methyl styrene, and ethyl styrene.

To react phenol with such an aforedescribed carbocyclic compound mixture, it is convenient to use Friedel-Crafts conditions, as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent acid catalyst in the presence of appropriate heat and pressure. Conveniently, the phenol and suitable Friedel-Crafts acid catalyst are mixed, brought to the proper temperature and the carbocyclic compound mixture metered into the acidified (or catalyzed) phenol.

For purposes of this invention, the reaction of carbocyclic compound mixture with phenol is preferably carried out at temperatures in the range of from about 25 to 200° C., although higher and lower temperatures can be used. Also, the reaction is preferably under liquid phase conditions at or below atmospheric pressures although superatmospheric pressures can be used. Inert hydrocarbons, as indicated above, generally facilitate the process. Such inert hydrocarbons can be readily removed, such as by vacuum stripping, at the completion of the reaction if desired. Especially when stripping is contemplated the most preferred inert hydrocarbons have boiling points between about 70 to 140° C. The progress of the reaction can be monitored if desired, by measuring the quantity remaining of unreacted carbocyclic compound mixture using, for example, vapor phase chromatography.

Friedel-Crafts catalysts which may be used in place of aluminum chloride, or together with aluminum chloride, include:

(A) Other inorganic halides, such as gallium, titanium, antimony and zinc halides (including ZnCl₂);

(B) Inorganic acids such as sulphuric, phosphoric and the hydrogen halides (including HF);

(C) Activated clays, silica gel and alumina and the like;

(D) BF₃ and BF₃ organic complexes, such as complexes of BF₃ with organic compounds, such as ethanol, butanol, glycol, phenol, cresol, anisole, ethyl ether, isopropyl ether, di-n-butyl ether, formic acid, acetic acid, propionic acid and the like, or with inorganic acids, such as phosphoric acid, sulfuric acid, and the like, and (E) Alkyl, aryl and aralkyl sulfonic acids, such as ethane sulfonic acid, benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, β-naphthalene sulfonic acid, 1-naphthol-4-sulfonic acid, and the like. When BF₃, as such, is employed, it is conveniently fed to a reaction mixture in gaseous form.

While any combination of carbocyclic compound starting mixture, phenol and catalyst can be used, it is particularly convenient to react in the presence of less than about 10 weight percent (based on the phenol) of acid catalyst.

The reaction mass is heated to a temperature in the range of from about 25 to 200° C. The rate of this reaction is dependent, to some degree, on the temperature employed. In general, the reaction is rapid, and a complete reaction between phenol and carbocyclic compound mixture is preferred. Generally a heating time of from about 10 minutes to 4 hours is employed. The various process variables are summarized in Table II below.

as by heating as necessary or desirable to make a resole product having characteristics generally as described

TABLE II

| Process variables | Broad range | Preferred range |
|---|---|---|
| Temperature, °C | About 25 to 200° C | About 40 to 125° C. |
| Reaction time | Less than about 4 hours | About 10 to 30 minutes. |
| Catalyst (based on phenol) | Less than about 10 weight percent | About 0.1 to 1.0 weight percent. |
| Inert hydrocarbon diluent (based on total weight carbocyclic mixture and diluent) | Up to about 75 weight percent | About 20 to 35 weight percent. |
| Total carbocyclic mixture¹ (based on 100 parts by weight phenol) | About 10 to 80 parts by weight | About 40 to 60 parts by weight. |

¹ On a 100 weight percent basis when in a form substantially free of other materials.

The properties of a given so-substituted phenol product are affected by the process conditions used to make that product (e.g. molecular weight distribution, color and the like). The resulting product is, as those skilled in the art will appreciate, a complex mixture of various different substituted phenols produced from the reaction of phenol under Friedel-Crafts conditions with the carbocyclic compound starting mixture to produce phenol molecules which are substituted both on ring carbon atoms and on phenol hydroxyl oxygen atoms by moieties derived from such carbocyclic compound.

A substituted carbocyclic compound phenol product can be prepared in a form substantially free of starting materials by conventional distillation separation techniques (e.g. steam distillation, vacuum stripping, and the like), as those skilled in the art will appreciate, but in making resoles for use in this invention, such product can be used directly as made.

In general, to produce a resole for use in this invention, a substituted phenol product, as just described, is neutralized under aqueous liquid phase conditions as by the addition of base, and then from about 0.8 to 2.0 mols of formaldehyde per one mol of phenol (preferably from about 1.0 to 1.5 mols aldehyde per mol of phenol) is mixed with the substituted phenol product (now itself a starting material). Water may be added with the formaldehyde. With formaldehyde, water is preferred. Formalin is preferred as a source for formaldehyde. Also, a basic catalyst material, such as hexamethylenetetramine, ammonium hydroxide, triethylamine, sodium hydroxide, or mixtures thereof (or the like) is introduced into the reaction mixture. This basic catalyst can be used to neutralize the starting substituted phenol. The pH of this reaction mixture is maintained above 7.0 and preferably in the range from about 7.5 to 8.5. This reaction mixture is then heated to temperatures of from about 60 to 100° C. for a time sufficient to substantially react most of the formaldehyde and produce a desired resole product. Times of from about 20 to 140 minutes are typical. Aqueous liquid phase preparation conditions are generally but not necessarily used.

To optimize electrical properties in resoles used in this invention, it is preferred to use as a basic catalyst, when reacting such substituting phenols with formaldehyde to make resole resins, one which is organic in character. Suitable process variables for making such resoles are summarized in Table III below.

above. Such a resole can be regarded as being the reaction product of the above-described substituted phenol mixture and formaldehyde under aqueous base catalyzed conditions as described which product can be thermoset by heat alone without the use of a curing catalyst.

In general, such a resole product as made is a brown colored, unstable, multiphase aqueous emulsion whose viscosity depends, in any given instance, upon process and reactant variables, but which usually ranges from a syrupy liquid to a semi-solid state. A resole product derived from such aqueous phase as a brown colored material whose viscosity varies from a syrup to a solid. Such emulsion is preferably dehydrated and formed into a varnish for use in making the enamels of this invention.

Thus, when such emulsion is dehydrated under heat and reduced pressure to a water content generally under about 15 weight percent but over about 2 weight percent, there is produced a single-phased, clear, resole resin in the physical form usually of a high solids viscous dark fluid. In any given instance, its total solids content, (residual) water content, and viscosity depend upon the amount of substituted phenol aldehyde product present, the mol ratio of aldehyde to substituted phenol, type and amount of methylolation catalyst, conditions and reactants used to substitute the phenol, methylolation temperature, degree of advancement, and the like.

When such a dehydrated liquid resole is further dehydrated to a water content under about 2 weight percent, there is produced a solid, so-called "one-stage lump resin" which consists substantially of pure resin. Usually the water content after such a dehydration is not less than about 0.5 weight percent of the product resin, in general.

Suitable resole dehydration conditions typically involve the use of a vacuum ranging from about 25 to 28 inches Hg and temperature ranging from about 40 to 90° C. Higher and lower temperatures and pressures can be employed, as those skilled in the art appreciate.

To prepare a varnish from a dehydrated resole product as described above, such resole is then conveniently dissolved in an organic liquid medium having properties generally as defined above. It is not necessary, and it is preferred not, to prepare the resole resin in the form of a solid before dissolution thereof in organic solvent. In general, the water content of the partially dehydrated resole material is controlled so that the water content of the solution of resole resin in such organic liquid (the

TABLE III

| Process variable | Broad range | Preferred range |
|---|---|---|
| Formaldehyde/phenol, mol ratio | About 0.8-2.0 | About 1.0-1.5. |
| Catalyst parts by weight (based on 100 parts by weight total phenol after neutralization of starting phenol) | About 0.1-10 | About 0.5-4. |
| pH | Above about 7.0 | About 7.5-8.5. |
| Temperature | About 60° C. to reflux | About 80° C. to reflux. |
| Reaction time | Under about 4 hours | About 20-140 minutes. |

The resole product produced by reacting the substituted resole with aldehyde as described above is one composed of methylolated substituted phenol which has been methylolated by the formaldehyde to a desired methylol content and optionally advanced (e.g. the molecular weight of the methylolated substituted phenol increased)

varnish) is below about 4 weight percent (based on total weight).

The organic liquid is a dispersant for the resin. By the term "dispersant" is embraced both solvation and suspension. The term "dissolved" as used herein has reference not only to dissolution but also to suspension. It will be appreciated that in a suspension of such resin that the particles suspended are under about 1 micron in average maximum cross-sectional dimension and preferably are under about 200 millimicrons in such dimension.

While the organic liquid used has properties as indicated above, it will be appreciated that such liquid can comprise mixtures of different organic liquids. Preferred liquids are cesols and lower alkanols (such as ethanol and methanol) and lower alkanones (such as acetone or methyl ethyl ketone). The term "lower" refers to less than 7 carbon atoms per molecule as used herein. Aromatic and aliphatic (including cycloaliphatic) hydrocarbons can also be employed as solvents for a given resin, including benzene, toluene, xylene, naphthalene, nonone, octane, petroleum fractions, etc. Preferably, the total water content of a varnish of the invention is below about 4 weight percent, and more preferably falls in the range of from about 0.5 to 2 weight percent.

Those skilled in the art will appreciate that care should preferably be taken when water is present to use an organic liquid system in which the phenolic resole resins are completely soluble as well as any water present. Adding for example, a ketone or an ether solvent like butyl Cellosolve will generally improve the water tolerance (ability to dissolve water) of a solvent system.

The varnishes thus made for use in this invention typically comprise:

(A) From about 20 to 75 weight percent of the above described substituted phenol-formaldehyde resoleresin, (B) From about 0.5 to 4 weight percent of dissolved water, and (C) The balance up to 100 weight percent of any given varnish being organic liquid which:

(1) is substantially inert (as respects such resin mixture).
(2) boils (evaporates) below about 275° C. at atmospheric pressures,
(3) is a dispersant for such resin and for such water (if present).

These varnishes are characteristically dark colored, one-phase, clear liquid solutions each having a viscosity ranging from about 5–5000 centipoises. The exact viscosity of a given varnish depends upon many chemical process and product variables. For impregnating applications, viscosities of from about 50 to 500 centipoises are preferred.

The total resin solids content of a given varnish product can be as high as about 85 weight percent or even lower, but preferred solids contents usually fall in the range of from about 25 to 65 weight percent.

The polyvinyl acetals useful in this invention are obtained by reacting polyvinyl alcohol or a partially hydrolyzed polyvinyl ester with an aldehyde, such as a lower alkanal like formaldehyde (preferred), acetaldehyde, propionaldehyde, butyraldehyde, mixtures thereof, or the like; or an aromatic aldehyde such as benzaldehyde, or the like. Polyvinyl acetals used in this invention preferably contain hydroxyl groups and preferably contain ester groups, the exact percentage of each in any given polyvinyl acetal depending upon the extent of the hydrolysis and the acetalization reactions. The preferred polyvinyl acetals are polyvinyl formal resins. Preferred polyvinyl acetals for use in this invention contain, on a weight basis, from about 0.1 to 16 weight percent ester groups calculated as polyvinyl ester, 5 to 25 weight percent hydroxyl groups calculated as polyvinyl alcohol, the balance up to 100 weight percent of any given polyvinyl acetal being substantially aldehyde acetal calculated as the corresponding polyvinyl acetal. These materials preferably have a weight average molecular weight from about 5,000 to 250,000 and more preferably from 10,000 to 50,000. In preferred polyvinyl acetals used in this invention, the ester groups are substantially all acetate groups, but it will be appreciated that other suitable polyvinyl aceteals can contain other ester groups such as formate groups, propionate groups, and the like.

Methods for the manufacture of polyvinyl acetals are well known to those of ordinary skill in the art and so are not detailed herein.

The polyvinyl acetals, for use in this invention are conveniently dissolved in an organic liquid.

The organic liquid is a dispersant for the polyvinyl acetal. By the term "dispersant" (as indicated above) is embraced both solvation and suspension and the term "dissolved" as used herein has reference not only to dissolution but also to suspension. It will be appreciated that in a suspension of such polyvinyl acetal that the particles suspended are under about 1 micron in average maximum cross-sectional dimension and preferably are under about 200 millimicrons in such dimension. The organic liquid used for the polyvinyl acetal is preferably a relatively high boiling (e.g. from about 125 to 275° C.). Typical liquids include mixtures of cresylic acid and so-called high flash naphthas.

To speed up the dissolution of the polyvinyl acetal in the liquid, heat may be employed. Typically, a solution of polyvinyl acetal in such an organic medium contains a total solids content ranging from about 5 to 25 weight percent of the polyvinyl acetal. The total solids content of a polyvinyl acetal solution can be as high as about 35 weight percent or even higher and as low as about 5 weight percent or even lower, but preferred such solids contents range from about 10 to 25.

To prepare a liquid enamel coating composition of the invention, it is generally convenient to employ a separately prepared substituted phenol-formaldehyde resin varnish and a separately prepared solution of a polyvinyl acetal in an organic solvent system. The organic liquid used may be a complex mixture of different chemical entities. Thus the organic liquid portion of an enamel composition of this invention can contain liquids boiling over a relatively wide range. It is preferred that a given enamel have a dry point below about 275° C. (e.g. all liquid vaporizes at normal atmospheric pressures below this temperatures. When a product enamel composition is to be used in wire coating, the art prefers to employ relatively high boiling organic liquids (as described above). The two respective solutions are often simply mixed together in the relative respective amounts needed to produce a product composition having the above indicated contents of respective components. It will be appreciated that any convenient preparation procedure can be employed.

For example, when preparing such a composition for use in wire coating, it is convenient to dissolve a substituted phenol-formaldehyde resin varnish and a polyvinyl formal, each in an organic liquid mixture comprising typically cresylic acid, and one or more other aromatic hydrocarbons. Examples of suitable hydrocarbons include petroleum derived mixtures like Solvesso 100 (a product of the Humble Oil Co.) xylol, mixtures thereof, and the like. It is usually convenient to employ from about 30 to 70 parts by weight of the cresylic acid, and, correspondingly from about 30 to 70 parts by weight of the naphthalenic hydrocarbon in a total given such organic solvent liquid mixture. As those skilled in the art will appreciate, cresylic acid is typically a mixture of different cresols and xylenols. Optionally, one can employ phenol itself as an additive to this mixture of cresylic acid and naphthalenic hydrocarbons. Thus, in general, one can use as much as 50 weight percent, or even more, of phenol in a total given such organic solvent liquid mixture. A preferred such mixture boils in the range of from about 125 to 200° C. The exact choice of a given solvent medium is determined by the boiling point desired for the resulting solution, the cost of the solvents available, viscosity and other coating characteristics desired in a given product solution. In general, one prefers to have in a product soluiton as low a viscosity as practical for a given total solids content because a low viscosity allows the use of a higher solids contents, which in turn tends to desirably reduce the overall cost per pound of solids coating deposited on a metal substrate due to reduced solvent losses.

An enamel coating composition of this invention typically has a viscosity less than about 50,000 centipoises, with preferred viscosities ranging from about 100 to 10,000 centipoises.

Any metal surface can be coated with a liquid coating composition of this invention as indicated above, but preferred substrate metals are copper (in the form of wire filaments ranging in average maximum cross-sectional dimension, typically but not necessarily a diameter from about 0.5 to 500 mils or even greater) and steel sheeting (as incorporated into drums and typically ranging in thickness from about 20 to 32 gauge).

Any convenient metal coating procedure can be employed to coat such a metallic substrate with a liquid enamel coating composition of this invention, including spraying, dipping, painting and the like. After application to a substrate surface, the coating is usually dried at an elevated temperature (e.g. at temperatures of from about 80 to 500° C., depending on the organic liquid used in the enamel) for a time sufficient to crosslink (cure or thermoset) the resulting coating as indicated above. Multiple coatings are especially useful and common, especially in wire coating. It is preferred to thermoset individual coatings after application and before applying a subsequent overcoating. When coating a wire with an enamel composition of this invention, for example, it is usually convenient to employ a so-called wire coating tower (which can be vertically, horizontally or otherwise oriented) in which the tower has a top roller (or a plurality of individual sheaves and a bottom roller) or a plurality of individual sheaves rotatably mounted at opposite end regions of the tower. Each roller optionally has a plurality of peripheral grooves therein to accomodate a plurality of individual strands of wire and effect a separation thereof. The central portion of the tower contains an enclosed vertical thermally insulated duct. This duct has at least one controllable heated zone. A first strand of a given wire from a spool is first coated and then passed through the heated zone of the tower. After such passage, the wire is recoated and repassed through the heated zone. After each coating operation and before entry into the heated zone, the freshly coated wire is passed through a wiper die to limit or control coating thickness optionally. Typically and preferably, the diameter of the wiper die is slightly larger than that of the wire before coating. For example, the diameter of a die can be from about 0.001 to about 0.020 inch greater than the diameter of the uncoated wire where the wire is from about 0.005 to 0.080 inch in diameter. As is well known in the art, fine copper wire is after coated without using wiper dies.

After a coating operation, a coated wire is wound up, conveniently, on a spool. A wire is thus continuously and rapidly coated, using such a tower, with a plurality of successively applied enamel coatings. Sometimes a first coating or coatings on a wire is used as a primer coat and this first coating can be different from later coatings, and sometimes one or more (e.g. two) top coat layers on a wire is (are) used as a finish coat and such last coating(s) can be different from earlier or intermediate coatings. Preferred top coatings are thermoset compositions of the invention. In general, conventional wire coating towers and associated methods of use can be employed in the practice of coating wire with compositions of this invention. At least one and preferably all coating layers are derived from compositions of the invention.

Those skilled in the art will appreciate that the compositions of this invention can additionally contain conventional additives, adjuvants, and the like known to the art of thermosetting enamels. One especially useful additive for addition to a liquid composition of this invention. is a polyurethane (typically from 5 to 100 weight percent based on polyvinyl acetal). A preferred class of polyurethanes is represented by the following general formula:

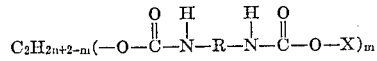

where R represents a member of the class consisting of phenylene, methyl phenylene, napthylene, and methyl naphthylene groups, X represents a member of the class consisting of phenyl and alkyl phenyl groups, said alkyl groups if present containing from 1 through 6 carbon atoms, $m$ is an integer greater than 1 but not greater than $n$, and $n$ is an integer from 2 through 10. These particularly polyurethanes are aliphatic aromatic polyesters of aromatic dicarbamic acids.

Another especially useful additive is a melamine-formaldehyde condensate (typically from about 1 to 10 weight percent based on the polyvinyl acetal). Suitable melamine-formaldehyde condensates are addition products of formaldehyde and melamine to produce a methylolated melamine product containing mono, di, tri, tetra, penta, and/or hexa methylolated melamine species. Thus, typical melamine-formaldehyde condensates have mol ratios of formaldehyde to melamine of from about 1 to 1 to 1 to 6.

When these formulations are used for drum liners, one can conventionally compound with a liquid composition of this invention up to about 30 weight percent of a pigment.

EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

Examples of substituted phenol-aldehyde resoles suitable for use in this invention are given below. Each has a formaldehyde to phenol mol ratio of from about 0.8 to 2.0, a viscosity in methanol solution at 60 weight percent solids of not greater than 1000 centipoises, and a free formaldehyde content less than 4 weight percent.

EXAMPLE A 100 parts of phenol and 0.3 part of a concentrated sulphuric acid are charged to a suitable reaction vessel and heated to 70° C. 70 parts of a carbocyclic compound mixture are added to the mixture over a period of 45 minutes, while keeping the temperature in the range of 70–80° C. The carbocyclic compound mixture used is available commercially as "Resin Oil" from the Monsanto Company and has a composition as described above in Table I. The temperature is held at about 70 to 80° C. after addition of the carbocyclic compound mixture for 15 minutes. Then 3 parts of hexamethylenetetramine, 2 parts of triethylamine and 60 parts of 50% Formalin (50-50 formaldehyde-water) are added to the reaction mixture. The reaction mixture is heated to atmospheric reflux at about 100° C. and refluxing is continued for about 2.5 hours. Then the mixture is cooled and volatile material is removed under vacuum until the mixture reaches 60° C. and about 26 inches Hg; then add 87 parts of ethanol to form a solution having 59.3% solids (measured by heating 1.5 grams of resin for 3 hours at 135° C.).

EXAMPLES B–M

The following examples of substituted phenol-aldehyde resoles are presented below in tabular form. The process conditions used in each instance is as shown in Example A. Other process variables are given in Table IV below:

TABLE IV

| | Phenol | Catalyst Type | Catalyst Amount | Carbocyclic compound mixture Type | Carbocyclic compound mixture Amount | Temperature, °C. | Post reaction time, minutes | Solvent used (1) |
|---|---|---|---|---|---|---|---|---|
| Example No.: | | | | | | | | |
| B | 100 | 1 | 1.0 | A | 50 | 75 | 15 | Cresylic acid. |
| C | 100 | 1 | 0.3 | A | 70 | 100 | 15 | Do. |
| D | 100 | 1 | 0.3 | A | 80 | 75 | 15 | Do. |
| E | 100 | 1 | 0.3 | B | 90 | 75 | 45 | Do. |
| F | 100 | 2 | 0.5 | B | 70 | 50 | 15 | Ethanol. |
| G | 100 | 1 | 0.3 | A | 70 | 75 | 15 | Do. |
| H | 100 | 1 | 0.3 | D | 50 | 75 | 60 | Cresylic acid. |
| I | 100 | 2 | 0.5 | C | 90 | 75 | 15 | Do. |
| J | 100 | 1 | 0.3 | C | 125 | 85 | 15 | Do. |
| K | 100 | 3 | 1.0 | D | 50 | 75 | 15 | Do. |
| L | 100 | 1 | 0.3 | D | 40 | 50 | 120 | Etanol. |
| M | 100 | 1 | 0.3 | A | 30 | 75 | 15 | Do. |

1 The cresylic acid used is available commercially under the trade designation "Cresylic Acid R-7B" from Allied Chemical Corporation. This material has a specific gravity of 1.022 to 1.032 at 25° C. compared to water at 15.5° C. and contains at leas 29 weight percent of meta cresol, and not more the 0.5 weight percent water. It has a distillation range at normal atmospheric pressure of 200° C. minimum to 227° C. maximum.

The numbers listed under "Type Catalyst" designate specific Friedel-Crafts catalysts as follows:

1—$H_2SO_4$
2—$BF_3$ diethyl ether
3—p-toluene sulfonic acid

The letters listed under "Type Carbocyclic Compound Mixture" each designate a specific carbocyclic composition as follows:

TABLE V

| | A | B | C | D |
|---|---|---|---|---|
| Styrene | 1-2 | 10.1 | 1 | 10 |
| Alpha-methyl styrene | 1-3 | 2.2 | 2 | 2 |
| Beta-methyl styrene | 1-3 | 2.1 | 2 | 2 |
| Vinyl toluene | 14-21 | 10.5 | 10 | 25 |
| $C_2$ alkyl stryene | 4-7 | 5.8 | 4 | 4 |
| Divinyl benzene | 1-2 | 1.6 | 1 | 1 |
| Indene | 15-22 | 12.7 | 10 | 25 |
| Methyl indene | 4-7 | 7.6 | 5 | 5 |
| Dicyclopentadiene | 12-18 | 1.1 | 5 | 25 |
| Methylcyclopentadiene | 4-6 | 2.1 | 1 | 1 |
| Inert diluent | 25-35 | 44.2 | 59 | 0 |

The columns designated, respectively "Phenol," "Amount Carbocyclic Mixture," and "Amount Catalyst" are in terms of parts by weight.

In each example, the product resin is a substituted phenol-formaldehyde resin (produced by reacting phenol with carbocyclic compound mixture) with formaldehyde using the process conditions of Example A above. Each resin is dehydrated as in Example A and then is dissolved in cresylic acid or ethanol as indicated.

EXAMPLE N

Charge 100 parts of phenol and 1 part of 47 percent $BF_3$ to a suitable reaction vessel and heat the mixture to 50° C. Add 50 parts of resin oil to the mixture over a period of 45 minutes while keeping the temperature at 50° C. Hold the temperature at 50° C. after addition of the resin oil for 1.5 hours. Then add 5 parts of $NH_4OH$, 2 parts of triethylamine and 60 parts of 50% Formalin (50-50 formaldehyde-water) to the reaction mixture. Now heat the reaction mixture to atmospheric reflux at 100° C. and continue refluxing the mixture for 2.5 hours. Then cool and remove volatile material under a vacuum until the mixture reaches 60° C. Then add 70 parts of cresylic acid to form a varnish solution having about 50 percent solids (measured by heating 1.5 grams of resin for 3 hours at 135° C.).

EXAMPLE O

Charge 100 parts of phenol and 0.3 part of a concentrated sulphuric acid to a suitable reaction vessel and heat the mixture to 70° C. Add 70 parts of resin oil to the mixture over a period of 45 minutes while keeping the temperature at 70–80° C. Hold the temperature at 70–80° C. after addition of the resin oil for 15 minutes. Then add 3 parts of hexamethylene tetramine, 2 parts of triethylamine and 60 parts of 50 percent Formalin (50-50 formaldehyde-water) to the reaction mixture. Now heat the reaction mixture to atmospheric reflux at 100° C. and continue refluxing the mixture for 2.5 hours. Then cool and remove volatile material under a vacuum of mercury until the mixture reaches 60° C. Then add 87 parts of cresylic acid to form a varnish solution having 59.3 percent solids (measured by heating 1.5 grams of resin for 3 hours at 135° C.).

Examples of liquid enamel compositions of this invention are given below:

EXAMPLE 1–13

The resole varnish compositions of Examples A–M (above) are each formulated with a polyvinyl acetal solution to prepare liquid enamel compositions. The preparation procedure in each instance involves adding with gentle stirring for mixing the indicated phenolic resole resin solution to the indicated solution of polyvinyl acetal.

The polyvinyl acetal solutions used in each instance involve a specified polyvinyl acetal dissolved in a mixture of cresylic acid and high flash naphtha. The cresylic acid used is as described in Examples B–M. The high flash naphtha used is available commercially under the trade designation "Solvesso 100" from Esso Corporation. This material reportedly contains about 1.13% $C_8$ aromatics, about 90.32% $C_9$ aromatics (especially 1-methyl, 3-ethyl benzene and 1,2,4-trimethylbenzene), about 1.80% indane and about 3% of $C_{10}$, $C_{11}$ and other aromatics, and it reportedly has a dry point of about 344° F. The concentration of polyvinyl acetal on a weight percent basis in each such solvent is as described in Table VI below. For convenience, the characteristics of each particular type of polyvinyl acetal used is listed in Table VII below.

Each product liquid enamel composition so made is as indicated in Table VI. Each is storage stable at room temperature for periods of time in excess of one week, and is dark brown in color. Each such product enamel composition displays typically a hazy appearance, color, when a sample thereof in a transparent container is held up to daylight. The organic liquid portion of each enamel has a dry point below about 275° C.

TABLE VI.—ENAMEL COMPOSITIONS

| Ex. No. | Polyvinyl acetal Wt. percent in total composition | Polyvinyl acetal Type | Substituted phenol-formaldehyde resin Wt. percent in total composition, 59.3 wt. percent solids | Substituted phenol-formaldehyde resin Type Ex. No. | Balance up to 100 weight percent cresylic acid and high flash, Naptha 40 to 60 parts by weight |
|---|---|---|---|---|---|
| 1 | 11.5 | 1 | 9.6 | A | 78.9 |
| 2 | 13.0 | 1 | 5.2 | B | 81.8 |
| 3 | 20.0 | 3 | 16.7 | C | 63.3 |
| 4 | 15.0 | 2 | 8.4 | D | 76.6 |
| 5 | 5.0 | 1 | 16.7 | E | 78.3 |
| 6 | 25.0 | 3 | 20.0 | F | 55.0 |
| 7 | 5.0 | 3 | 75.0 | G | 20.0 |
| 8 | 10.3 | 4 | 8.4 | H | 81.8 |
| 9 | 10.7 | 2 | 17.5 | I | 71.8 |
| 10 | 11.5 | 1 | 11.5 | J | 77.0 |
| 11 | 10.7 | 5 | 8.4 | K | 80.9 |
| 12 | 10.3 | 2 | 10.3 | L | 79.4 |
| 13 | 13.0 | 3 | 6.1 | M | 80.9 |

TABLE VII

| Type designation | Chemical composition designation [1] | Wt. percent ester groups [2] | Wt. percent hydroxyl groups [3] | Aldehyde acetal [4] |
|---|---|---|---|---|
| 1 | Formvar 15/95E | 9.5–13 | 5–6 | 85.5–81 |
| 2 | Formvar 7/95E | 9.5–13 | 5–6.5 | 85.5–80.5 |
| 3 | Formvar 5/95E | 9.5–13 | 5–6.5 |  |
| 4 | Butvar B–90 | 0.1–1 | 18–20 | 82–79 |
| 5 | 50:50 blend of Type 1 and Type 2 | 9.5–13 | 5–6.25 | 85.5–80.75 |

[1] Formvar and Butvar are Monsanto Company trademarks.
[2] Ester groups calculated as polyvinyl acetate.
[3] Hydroxyl groups calculated as polyvinyl alcohol.
[4] Aldehyde-acetal calculated as the corresponding polyvinyl acetal.

EXAMPLE 14

A liquid enamel composition of this invention is prepared. The organic liquid used in the enamel composition has the following composition:

TABLE VIII

|  | Grams | Parts by weight total composition |
|---|---|---|
| Cresylic acid [1] | 718 | 27.70 |
| Phenol | 213 | 8.21 |
| Panasol AN1 [2] | 396 | 15.29 |
| Xylene | 396 | 15.29 |
| High Flash Naphtha [3] | 297 | 11.46 |

[1] The cresylic acid used is as described in Table IV above.
[2] Panasol AN1 is available from the Amoco Chemical Company and is an aromatic hydrocarbon mixutre characterized by having a dry point of not more than about 266° C. and containing not less than about 95 volume percent of aromatic hydrocarbons. It has a Kauri-Butanol value of about 108.
[3] The high flash naphtha used is as described in Examples 1–13 (above).

In this organic liquid are dispersed with mixing the following components:

TABLE IX

|  | Grams | Parts by weight total composition |
|---|---|---|
| Formvar 15/95E [1] | 120 | 4.64 |
| Formvar 7/95E [1] | 180 | 6.96 |
| Varnish of Example A | 200 | 4.64 |
| Polyurethan [2] | 60 | 1.16 |
| Melamine-formaldehyde condensates [3] | 10 | 0.23 |

[1] Formvar 15/95E and Formvar 7/95E are as described above in Table VII.
[2] The polyurethane used here is like that described in Example 1 of U.S. Patent 3,007,462. This polyurethane is used in the form of a 50 weight percent solution in 50-50 cresylic acid-high flash naptha liquid mixture (as these component liquids are described above in Table IV and in Examples 1–13 above, respectively).
[3] The melamine-formaldehyde condensates used here is that available commercially under the trade designation Resimene 882-60 from the Monsanto Company, St. Louis, Missouri and is a 60 weight percent solids solution in xylene.

This enamel composition is particularly well suited for use in wire coating.

Examples of coated metal substrates of this invention are given below:

EXAMPLES 15–26

Each of the enamel compositions of Examples 1–12 is coated onto AWG 18 copper wire using a 25 foot gas-fired two-zone vertical wire tower 25 feet in height. Six passes are employed unless otherwise noted. A total coating thickness of about 1½ mils, e.g. a build on the wire of about 3 mils total coating thickness increase in diameter over the uncoated wire. Each coated layer is cured before a subsequent layer is applied. The oven temperatures at the bottom end and at the top end for the application of each enamel composition are as described in Table VI below as is wire speed. Coating procedure for each successive coating involves passage of the wire being coated through a bath of enamel followed by passage through a wiper die. The wiper dies for each successive coating are graduated so as to be incrementally larger in diameter than the previous uncoated thickness, thereby to control ultimate coating thickness and to produce approximately equal and uniform thickness in individual layers.

Each resulting so-coated wire has a smooth, continuous hard, electrically insulating coating which is adherent to the wire and is solvent resistant. Low coefficients of friction are characteristically observed.

TABLE X.—WIRE COATING EXAMPLES

| Example No.: | Enamel No. | Oven temperature, °F. Top | Oven temperature, °F. Bottom | Speed, f.p.m. | Remarks |
|---|---|---|---|---|---|
| 15 | 1 | 725 | 500 | 50 |  |
| 16 | 2 | 750 | 475 | 50 |  |
| 17 | 3 | 875 | 525 | 65 |  |
| 18 | 4 | 750 | 525 | 40 |  |
| 19 | 5 | 900 | 525 | 75 | 8 passes. |
| 20 | 6 | 725 | 475 | 40 | 4 passes. |
| 21 | 7 | 925 | 500 | 75 |  |
| 22 | 8 | 700 | 475 | 30 |  |
| 23 | 9 | 775 | 500 | 45 |  |
| 24 | 10 | 750 | 500 | 40 |  |
| 25 | 11 | 725 | 500 | 40 |  |
| 26 | 12 | 775 | 500 | 45 |  |

EXAMPLES 27 AND 28

The enamel of Example 13 is knife-coated onto a 20 mil thick aluminum panel and onto a 20 gauge steel panel. Each resulting panel is cured to yield a one mil dry film which is smooth, non-porous, adherent and solvent resistant. When subjected to the test cup procedure described in "Paint & Varnish Production" for September 1965, pp. 71–74, it is observed that the cured enamel surface derived from an enamel of Example 13 displays no discoloration and is homogeneous and continuous.

EXAMPLE 29

The enamel of Example 13A is coated onto AWG 18 copper wire using a 25 foot vertical oven as described in Examples 14–25. The oven temperature is approximately 450° F. at the bottom end and approximately 900° F. at the top end. Wire speed is about 60 feet per minute in the oven. Six passes are employed to produce a final coating approximately 1½ mils in thickness. The so-coated wire is found to have a coefficient of friction when measured using ASTM Test Procedure D1676–59T which is unusually low. The wire is also found to have an excellent combination of electrical insulation and mechanical strength properties. Thus, typical cut-through values range from about 165 to 230° C., typical heat shock values are about IX at 180° C. and typical toluene methanol extraction displays a weight loss of about 5%.

EXAMPLE 30

A wire enamel is prepared having the following formulation:

| | Percent by weight |
|---|---|
| Formvar 15/95E | 40 |
| Example N resin varnish solution (50% in cresylic acid) | 40 |
| Cresylic acid | 102 |
| Naphtha solvent | 173 |

The designated amounts of naphtha and cresylic acid are weighed into a mixing tank and agitated, the 50–50 cresylic acid solution of resin oil modified phenolic resin is added and the whole is well mixed. The solid polyvinyl resin is added slowly and the mixture stirred until the polyvinyl resin is completely dissolved.

EXAMPLE 31

An enameled wire is produced by drawing a clean AWG No. 18 copper magnet wire through a bath of the enamel of Example 30. The wire is drawn through the bath in a six pass operation with successive dies having diameters of 0.046, 0.047, 0.048, 0.049, 0.050, 0.051, inch and the coated wire is passed through a vertical oven 11 feet high at a speed of about 17 feet per minute, the hottest portion of the oven being at a temperature of about 350° C.

The resulting coated wire is tested and the values of various properties are given in Table XI. Table XI also includes the average properties of conventional polyvinyl formal-cresol resin enamels similarly coated on AWG No. 18 copper magnet wire.

TABLE XI

| Property | Example II Wire | Conventional Wire |
|---|---|---|
| Roughness count | Zero | Zero |
| Build, mils | 3.0 | 3.0 |
| Flex, 25% el | 1X | 1X |
| Jerk | P | P |
| Abrasion, multiple strokes | 61/43 | 60/40 |
| Alc./tol. boil | P | P |
| 160° C. flex life, hrs | 24 | 18 |
| Tol./MeOH extract, percent | 5.5 | 5.5 |
| Cut through, ° C | 212 | 210 |
| 180° C. heat shock | Pass 1X | 1X |
| 1 Kv. Life, 200° C, hrs | 116 | 101 |
| Diel. strength dry, v./mil | 3,240 | 2,500 |
| Diel. strength wet, v./mil | 2,540 | 1,400 |

[1] At 160° C.

*Build.*—The addition to the diameter of the bare wire, in thousandths of an inch, is measured by means of a micrometer caliper.

*Flexibility.*—The flexibility of the coating is measured by a modified A.S.A. (American Standard Association) procedure whereby the coated wire is first stretched approximately 25% in length then wrapped around circular mandrels of the same diameter as the wire or multiple diameters thereof. The smallest diameter mandrel about which the coated wire can be lapped for ten turns without visible cracks or ruptures is reported. For example, a report of one signifies that the sample will pass on a mandrel of the same diameter as the wire being tested, while the report of two signifies that the coating may not be wrapped around a mandrel smaller than twice the diameter of the wire without failure within ten turns.

*Jerk test.*—This test is a measure of the adherence and flexibility of the cured film to the metal wire and is made in accordance with A.S.A. specifications, whereby a sample of the cured coated wire is elongated to failure of the wire at a wire travel rate of 12–16 feet per second. The sample passes the test if no cracks or loss of adherence appears in the coating more than ⅛ inch from the break after the test.

*The scrape abrasion test.*—This test consists essentially in scraping repeatedly the insulated wire sample with a steel needle loaded with a set weight which is varied according to the build of the wire. The tester records the number of strokes and shuts off when contact is made between the needle and the bared wire. Insulation which withstands an average of 30 strokes in six different places is considered standard provided that no one place wears down with less than 15 strokes.

*Toluene-alcohol boil.*—A test for solvent resistance made in accordance with modified A.S.A. procedure, which subjects a coated wire to mechanical stress to measure the removability of the coating after a ten minute immersion in an equivolume boiling solution of ethanol and toluene.

*Flexlife at 160°C.*—The flexibility of the coating on heat aging is determined by storing samples of the coated wire at 160° C. and determining the number of hours at which cracking or crazing occurs in the coating when wound around circular mandrels whose diameters were 3 times the diameter of the wire. If the coated wire could not be flexed around the 3 diameter mandrel after a period of heat aging without the occurrence of cracking in the coating, the coating was considered to have failed and the flexlife reported is the time of heating before such failure occurs.

*Toluene methanol extractibles.*—Weighed specimens are immersed successively in boiling reagent grade toluene and reagent grade methanol for a period of 2 hours immersion in each solvent. The samples are then dried and re-weighed, whereupon the amount of coating which has been extracted during the successive immersions is calculated and reported on a percent weight loss basis.

*Cut-through temperature.*—The cut-through temperature is a test for thermoplastic flow of the coating, whereby crossed, coated wires are mechanically loaded while the ambient temperature is raised until electrical contact is made between the metallic substrates of the wires. The temperature at failure is reported.

*Heat shock.*—Heat shock is a measure of the cracking of a stressed wire coating when heated to the 180° C. temperature indicated. Coated wire is first wound about mandrels of one, two, and three times the diameter of the coated wire, then heated in a mechanical-convection oven for one hour at the indicated temperature. The specimens are thereafter examined for cracks and the smallest mandrel over which no cracks in the coating have developed is reported.

*1 kilovolt-life test.*—The 1 kv.-life test was made in accordance with the provisions of the American Institute of Electrical Engineers specifications No. 57, dated October 1955. The test is a measure of the period for which a coating can be exposed at the particular temperature indicated before it will fail as electrical insulation upon the application of 1000 volts for one second to the sample. Ten samples are used in each test.

*Dielectric.*—The dielectric strength coating was measured by an A.S.A. procedure whereby the voltage at which the breakdown between the coatings on a pair of twisted coated wires occurred is reported on the basis of a per unit thickness of the coating.

EXAMPLE 32

A wire is coated with the varnish solution of Example 0 prepared (as in Example 30) into an enamel composition and the enamel is coated on wire as in Example 31. Upon testing the coated wire, results in properties are comparable to those obtained in Example 31.

EXAMPLE 33

A wire is coated as in Example 31 with the enamel composition as in Example 30 except that the Formvar 15/95E was omitted and 15 parts of the resin oil modified phenolic solids are present in the enamel. A smooth coated wire is obtained.

The wire enamels of the present invention are stable under usual storing conditions. Further, no initiator other than heat is required to accomplish the reaction of the resins, although curing catalyst such as acids, acid salts, hexamethylenetetramine and the like can be used. In the commercial type wire towers generally employed for wire enameling, it is preferred to conduct the reaction at tower operating temperatures of approximately 175 to 500° C.

The resins of this invention form valuable insulative coatings both on magnet wire and in other applications such as for example foil condensers. These coatings are smooth, slippery, tough, adhere well to metals, are resistant to solvents and abrasion, and are comparable to conventional wire enamels in hermetic applications.

It is to be understood that the present invention is not limited to the particular wire coating compositions, applications or wire sizes described above. It is obvious from the above test results that it is possible to utilize the present coating compositions as the base coat on a wire and to apply as an overcoat one or more of the many compatible insulating varnishes and thereby obtain a coating acceptable at even higher operating temperatures. It is also obvious that the present enamels may be applied as the top coat enamel over a base coat of less thermally resistant and solvent resistant coatings, and it is not intended to limit the application of the enamel solids to wire for electrical insulation purposes.

It is possible by means of dipping, casting and other conventional means to form insulation from such a mixture that is useful in such electrical applications as slot liners, encapsulation, sheet insulation, and surface coatings. The coating compositions shown can also be used as an adhesive or impregnating varnishes for such articles as glass tapes and electrical coils. Other non-electrical uses of the compositions are apparent where chemical resistance and temperature stability of the final product are needed, such as surface coatings and others.

What is claimed is:
1. A liquid enamel composition adapted for use as a metal coating comprising:
(A) from about 5 to 75 weight percent of a substituted phenol-formaldehyde resole resin,
(B) from about 5 to 30 weight percent of a polyvinyl acetal characterized by having:
 (1) a weight average molecular weight of from about 5,000 to 250,000, and
 (2) from about 0.5 to 16 weight percent ester groups calculated as polyvinyl ester, from about 5 to 25 weight percent hydroxyl groups calculated as polyvinyl alcohol, and the balance up to 100 weight percent of any given polyvinyl acetal being substantially aldehyde acetal calculated as the corresponding polyvinyl acetal,
(C) the balance up to 100 weight percent of any given enamel being substantially an organic liquid, which:
 (1) is substantially inert,
 (2) has a dry point below about 275° C. at atmospheric pressures,
 (3) is a dispersant for both said resin and said polyvinyl acetal,
(D) said substituted phenol-formaldehyde resole resin being characterized by:
 (1) having a formaldehyde to phenol mol ratio of from about 0.8 to 2.0,
 (2) being produced by reacting under aqueous phase conditions formaldehyde and a substituted phenol mixture in the presence of a basic catalyst,
 (3) being substantially insoluble in water but having a viscosity in methanol solution at 60 weight percent solids concentration of not greater than about 5000 centipoises, and
 (4) having a free formaldehyde content which is less than about 5 weight percent,
(E) said substituted phenol mixture having been prepared by reacting phenol under Friedel-Crafts conditions with from about 35 to 80 parts by weight for each 100 parts by weight of said phenol of a mixture of carbocyclic compounds,
(F) said mixture of carbocyclic compounds comprising (on a 100 weight percent basis when in a form substantially free of other materials),
 (1) from about 10 through 40 weight percent (total mixture basis) of compouonds each molecule of which has:
  (a) the indene nucleus,
  (b) from 9 through 13 carbon atoms,
  (c) as nuclear substituents from 0 through 4 methyl groups,
 (2) from about 5 through 70 weight percent (total mixture basis) of compounds, each molecule of which has:
  (a) the dicyclopentadiene nucleus,
  (b) from 10 through 13 carbon atoms,
  (c) as nuclear substituents from 0 through 3 methyl groups,
 (3) from about 15 through 65 weight percent (total mixture basis) of compounds, each molecule of which has:
  (a) a phenyl group substituted by a vinylidene group,
  (b) from 8 through 13 carbon atoms,
  (c) as substituents from 0 through 3 groups selected from the class consisting of methyl and ethyl,
 (4) from about 0 through 5 weight percent divinyl benzene,
 (5) provided that the sum total of all such compounds in any given such mixture of carbocyclic compounds is always 100 weight percent.

2. An enamel composition of claim 1 additionally containing from about 5 to 100 weight percent based on said polyvinyl acetal of a polyurethane represented by the general formula:

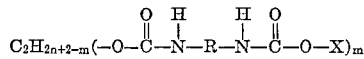

where R represents a member of the class consisting of phenylene, methyl phenylene, naphthylene, and methyl naphthylene groups, X represents a member of the class consisting of phenyl and alkyl phenyl groups, said alkyl groups if present containing from 1 through 6 carbon atoms, $m$ is an integer greater than 1 but not greater than $n$, and $n$ is an integer from 2 through 10.

3. An enamel composition of claim 1 additionally containing from about 1 to 10 weight percent based on said polyvinyl acetal of a melamine-formaldehyde condensate.

4. As an article of manufacture, a metal substrate coated with at least one layer of a thermoset material derived from a composition of claim 1 by applying such a composition over said substrate and thereafter applying sufficient heat thereto to evaporate said organic liquid therefrom and to thermoset said resole resin and said polyvinyl acetal.

5. The article of claim 4 wherein said metal substrate is a copper wire.

6. The article of claim 4 wherein said metal substrate is a steel sheet.

References Cited
UNITED STATES PATENTS

| | | | |
|---|---|---|---|
| 2,843,566 | 7/1958 | Christenson et al. | 260—844 |
| 2,907,751 | 10/1959 | Christenson et al. | 260—53 |
| 2,964,491 | 12/1960 | Rylander et al. | 260—844 |
| 3,075,832 | 1/1963 | Ecke et al. | 260—53 |
| 3,104,236 | 9/1963 | Lavin et al. | 260—844 |

JOHN C. BLEUTGE, Primary Examiner

U.S. Cl. X.R.

260—53, 841, 844, 29.3, 32.8, 33.2, 33.4, 33.6; 117—62.2, 128.4, 132, 218, 232